(12) United States Patent
Sakurai et al.

(10) Patent No.: US 6,256,280 B1
(45) Date of Patent: Jul. 3, 2001

(54) DISK EJECTION DEVICE

(75) Inventors: Toshihiro Sakurai; Keisuke Nakayama; Masao Ohkita, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/264,090

(22) Filed: Mar. 8, 1999

(30) Foreign Application Priority Data

Mar. 16, 1998 (JP) .................................................. 10-065028

(51) Int. Cl.[7] .................................................. G11B 17/04
(52) U.S. Cl. .......................................................... 369/77.1
(58) Field of Search .............................. 369/75.2, 77.1, 369/176, 36, 34, 77.2, 75.1; 360/99.02, 98.04

(56) References Cited

U.S. PATENT DOCUMENTS

| 4,682,320 | | 7/1987 | D'Alyer de Costman | ......... 369/97.1 |
| 4,979,160 | * | 12/1990 | Araki | ................... 369/75.2 |
| 5,022,023 | | 6/1991 | Toyoguchi | ........................ 369/77.1 |
| 5,195,077 | * | 3/1993 | Ishikawa et al. | ................ 369/75.2 |
| 5,353,269 | * | 10/1994 | Kabayashi et al. | .................... 369/36 |
| 5,481,513 | * | 1/1996 | Takamatsu et al. | .................... 369/36 |
| 5,583,839 | | 12/1996 | Choi | .................................... 369/75.2 |
| 5,691,969 | * | 11/1997 | Fukisawa | ............................ 369/77.1 |
| 5,715,230 | * | 2/1998 | Choi | .................................... 369/192 |

FOREIGN PATENT DOCUMENTS

| 0 200 705 A2 | | 4/1986 | (EP) . |
| 0 391 424 A2 | | 5/1990 | (EP) . |
| 2 286 713 | * | 8/1995 | (GB) . |
| 01317271 | | 12/1989 | (JP) . |
| 0 611 1443 | | 4/1994 | (JP) . |

* cited by examiner

*Primary Examiner*—William R. Korzuch
*Assistant Examiner*—Ianjie Chen
(74) *Attorney, Agent, or Firm*—Brinks Hofer Gilson & Lione

(57) ABSTRACT

A disc ejection device is provided separate from a disk loading device in a disc device for disc playback or recording. When a disc loaded on a turntable in a disc driving section is ejected, it is lifted up by a moving table, is fed out by a first ejection member, and is then ejected from an ejection slot by a second ejection member disposed near the ejection slot. Immediately after the first ejection member feeds out the disc, it returns to an initial retracted state so as to allow a new disc to be loaded into the disc driving section. Accordingly, the loaded disc and a new disc can be switched inside the disc device.

7 Claims, 7 Drawing Sheets

DISK EJECTION DEVICE

BACKGROUND OF THE INVENTION

1. Field of the Invention

The present invention relates to a disc device for CDs, DVDs, and the like, and more particularly, to a disc ejection means for ejecting a disc from the disc device.

2. Description of the Related Art

In a conventional disc device of a slot-in loading type, a disc is loaded and ejected by a feeding force of a feeding roller serving as a disc conveyor means that is disposed near a loading slot.

This disc device is further divided into, for example, a type in which a disc is clamped between a feeding roller and a driven roller disposed parallel to the feeding roller, and a type in which a disc is clamped between a feeding roller and a disc guide member disposed on a top plate of the disc device or the like.

In the conventional disc device, a disc inserted from the loading slot is conveyed to a disc driving section in the inner part of the device by a forward feeding force of the feeding roller to be laid on a turntable in the disc driving section. Then, a disc conveyor means is retracted away from the disc, and a clamper moves down, whereby the disc is clamped between the clamper and the turntable. Subsequently, a predetermined rotation is applied to the disc by a spindle motor, and a pickup performs disc playback or recording.

When ejecting the disc, the rotation of the spindle motor is stopped, and the damper moves up, thereby releasing the disc. Moreover, the disc is clamped again by the disc conveyor means, is ejected from the disc driving section by reversely rotating the feeding roller, and is then ejected from the loading slot to the outside of the disc device.

In the above-described disc device, however, loading and ejection of the disc is performed by the same disc conveyor means, and therefore, disc exchange takes much time. That is, for the purpose of disc change, there is a need to eject the existing disc (first disc), which has undergone playback or recording, to the outside and to subsequently insert a new disc (second disc) into the disc device. Furthermore, since the existing disc and the new disc are manually switched outside the disc device, such disc exchange requires much time and labor.

In order to solve such problems, it may be possible to shorten disc switching time by separating a disc loading device and a disc ejection device so that a new disc is loaded by the disc loading device, and simultaneously, the existing disc is ejected by the disc ejection device. In this case, it is necessary to perform the disc switching operation inside the disc device to avoid troublesome disc exchange.

It is, however, a problem as to which disc ejection device is to be used to eject the disc.

SUMMARY OF THE INVENTION

It is accordingly an object of the present invention to provide a disc device in which a disc loading device and a disc ejection device are separate to solve the above conventional problems, and more particularly, to provide the disk ejection device.

According to an aspect of the present invention, there is provided a disc ejection device of a disc device including a conveyor means for transferring a disc inserted from a loading slot to a disc driving section, and an ejection means for ejecting the disc from the disc driving section to an ejection slot, wherein the ejection means has a first ejection member for moving the disc from the disc driving section toward the ejection slot by a predetermined distance, and a second ejection member for further pushing the disc moved by the predetermined distance to the ejection slot.

The first ejection member serves to convey the existing disc positioned in the disc driving section to the second ejection member on the side of the ejection slot, and the second ejection member serves to eject the conveyed disc from the ejection slot to the outside of the disc device. That is, the existing disc can be ejected with the cooperation of the first ejection means and the second ejection means.

After the first ejection member expands and delivers the existing disc to the second ejection member, it immediately returns to an initial retracted state. Therefore, a loading operation of a new disc to be simultaneously performed is prevented from being interfered with by the first ejection member, and functions smoothly. Furthermore, since an operation for finally ejecting the disc is performed by the second ejection member disposed on the side of the ejection slot, it can be reliably performed without being interfered with by an operation of loading a new disc into the disk driving section in the inner part of the device.

Preferably, the first ejection member is formed of a pair of ejection arms that intersect each other.

Since the pair of ejection arms act in a so-called pantographic manner, that is, the leading ends thereof expand toward the ejection slot, they can feed out the disc toward the second ejection member. Furthermore, since the leading ends move in a direction such that they come close to each other, it is possible to reliably feed out the disc positioned between the leading ends, regardless of the diameter of the disc.

Further objects, features, and advantages of the present invention will become apparent from the following description of the preferred embodiment with reference to the attached drawings.

DESCRIPTION OF THE PREFERRED EMBODIMENT

The present invention will be described below with reference to the attached drawings.

Figure 1A:
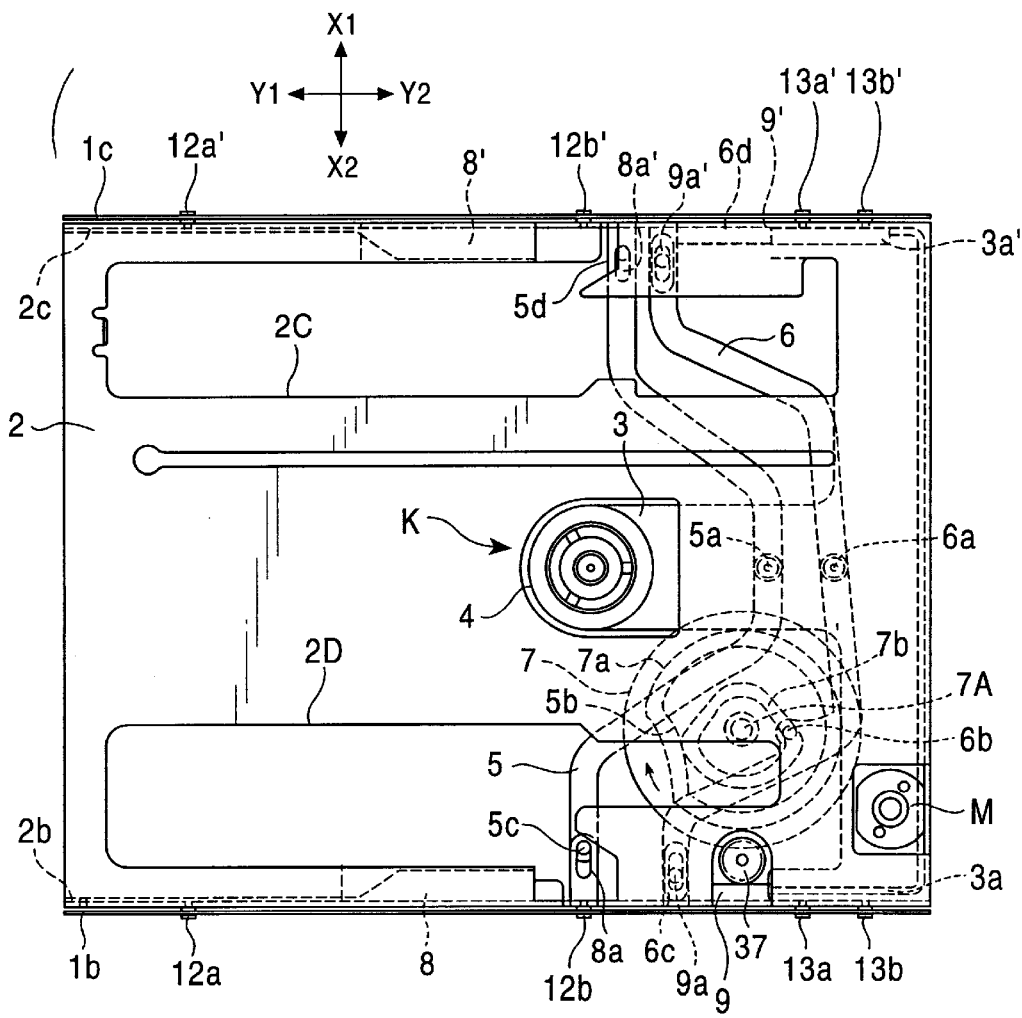
FIGS. 1A and 1B are plan and side views illustrating a main housing of a disc device according to the present invention.
Figure 1B:
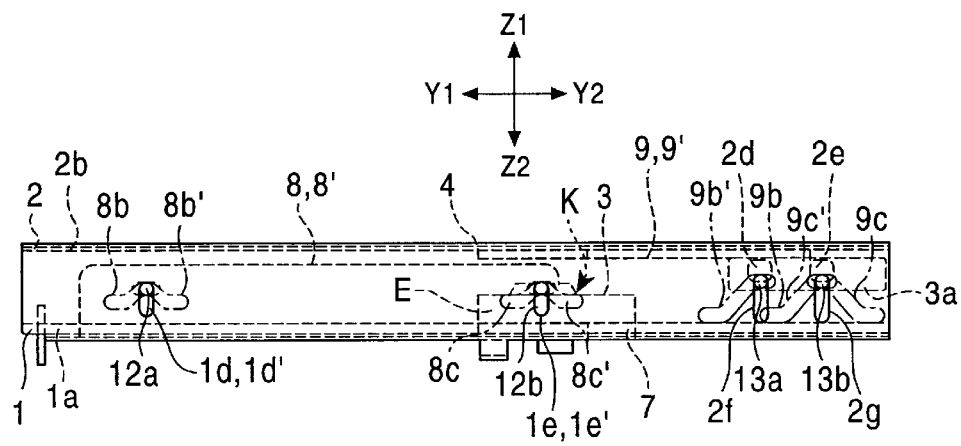

FIGS. 1A and 1B are plan and side views illustrating a main housing of a disc device according to the present invention.

In the disc device shown in FIG. 1, a main housing 1 on the bottom plate side is covered with a top plate 2 on the top face side (Z1-side). Between the main housing 1 and the top plate 2, there is provided a clamp mechanism K that is composed of a clamp chassis 3, and a clamper 4 rotatably supported at the leading-end of the clamp chassis 3. The Y1-side in the figure designates a disc insertion side, and the Y2-side designates the inner side of the device. On the insertion side of the disc device, two slots, a loading slot (EN) and an ejection slot (EX), are vertically arranged.

On a bottom face 1a of the main housing 1, a first connecting member 5 and a second connecting member 6, which are formed substantially in a V-shape, are arranged side by side and are pivotally supported by center shafts 5a and 6a. A rotation shaft 7A is interposed between the first connecting member 5 and the second connecting member 6 so as to rotatably support a disc-like rotating cam 7. That is, the rotating cam 7 is disposed on the upper side of the first connecting member 5 and the second connecting member 6. The rotating cam 7 is provided with a plurality of cam grooves on both the front and back sides thereof, and cam grooves 7a and 7b formed on the back (Z2) side are shown by dotted lines in FIG. 1. The rotating cam 7 also has gear grooves formed around the rim thereof to be meshed with a transmission gear 37 and a small gear 47 that will be described later. A projection 5b formed on the first connecting member 5 is inserted in one of the cam grooves 7a on the outer peripheral side, and a projection 6b formed on the second connecting member 6 is passed through the other cam groove 7b on the inner peripheral side. At one corner (on the Y2- and X2-sides) of the disc device, a driving motor M is mounted, by which the rotating cam 7 is rotated in the clockwise direction in the figure via a train of gears (not shown). When the rotating cam 7 rotates, the projections 5b and 6b move in the cam grooves 7a and 7b, respectively. This movement pivots the first connecting member 5 and the second connecting member 6 on the center shafts 5a and 6a in the clockwise or counterclockwise direction, respectively.

The first connecting member 5 has projections 5c and 5d at both ends thereof. These projections 5c and 5d are passed through slots 8a and 8a' of elevating members 8 and 8' that extend along side plates 1b and 1c of the main housing 1, respectively. Similarly, the second connecting member 6 has projections 6c and 6d at both ends thereof, which are passed through slots 9a and 9a' formed in elevating members 9 and 9'. The elevating members 8 and 9 are slidable in the Y-direction in the figure along the side plate 1b of the main housing 1, and side plates thereof, which are bent to the Z1-side, as shown in FIG. 1B, are provided with crank grooves 8b and 8c, and crank grooves 9b and 9c. Similarly, side plates of the elevating members 8' and 9', which are bent to the Z1-side along the side plate 1c, as shown by dotted lines in the figure, are provided with crank grooves 8b' and 8c' and crank grooves 9b' and 9c', respectively. While the-crank grooves 8b and 8c are inclined upward to the Y2-side in the figure, the crank grooves 8b' and 8c' are inclined downward to the Y2-side. Similarly, while the crank grooves 9b and 9c are inclined downward to the Y2-side, the crank grooves 9b' and 9c' are inclined upward to the Y2-side. That is, the crank grooves 8b and 8c are laterally asymmetric with respect to the crank grooves 8b' and 8c', and the crank grooves 9b and 9c are laterally asymmetric with respect to the crank grooves 9b' and 9c'. The side plate 1b of the main housing 1 is provided with slots 1d and 1e extending in the Z-direction to overlap with the crank grooves 8b and 8c. Similarly, the side plate 1c of the main housing 1 is provided with slots 1d' and 1e' extending in the Z-direction to overlap with the crank grooves 8b' and 8c'.

One side plate 2b of the top plate 2 is provided with moving pins 12a and 12b projecting in the X2-direction, and the other side plate 2c is provided with moving pins 12a' and 12b' projecting in the X1-direction. The moving pin 12a is passed through the crank groove 8b and the slot 1d, and the moving pin 12b is passed through the crank groove 8c and the slot 1e. The above also applies to the side plate 1c on the X1-side, that is, the moving pin 12a' is passed through the crank groove 8b' and the slot 1d' and the moving 12b' is passed through the crank groove 8c' and the slot 1e'.

For example, when the rotating cam 7 rotates and the first connecting member 5 is thereby pivoted in the counterclockwise direction, the elevating member 8 moves in the Y2-direction and the elevating member 8' moves in the Y1-direction. At this time, the moving pins 12a and 12b on the side of the side plate 1b descend along the slopes of the crank grooves 8b and 8c, and the moving pins 12a' and 12b' on the side of the side plate 1c descend along the slopes of the crank grooves 8b' and 8c', so that the top plate 2 is moved down in the Z2-direction. When the first connecting member 5 is pivoted in the clockwise direction, the elevating member 8 moves in the Y1-direction, and the elevating member 8' moves in the Y2-direction. Consequently, in contrast to the above, the moving pins 12a and 12b on the side of the side plate 1b ascend along the slopes of the crank grooves 8b and 8c, and the moving pins 12a' and 12b' ascend along the slopes of the crank grooves 8b' and 8c', so that the top plate 2 is moved up in the Z1-direction.

The clamp chassis 3 is interposed between the main housing 1 and the top plate 2. Side plates 3a and 3a' of the clamp chassis 3 are respectively provided with moving pins 13a and 13b, and moving pins 13a' and 13b' that project to both sides. The moving pins 13a and 13b are passed through U-shaped grooves 2d and 2e formed in the side plate 2b of the top plate 2, and the crank grooves 9b and 9c formed in the elevating member 9, and furthermore, are passed through slots 2f and 2g formed in the side plate 1b of the main housing 1. This also applies to the moving pins 13a' and 13b' on the X1-side. Accordingly, when the rotating cam 7 rotates and the second connecting member 6 is thereby pivoted clockwise, the elevating member 9 moves in the Y1-direction, and the elevating member 9' moves in the Y2-direction. At this time, the moving pins 13a and 13b on the side of the side plate 3a descend along the slopes of the crank grooves 9b and 9c, and the moving pins 13a' and 13b' on the side of the side plate 3a' descend along the slopes of the crank grooves 9b' and 9c', so that the clamp chassis 3 is moved down in the Z2-direction. Conversely, when the second connecting member 6 is pivoted in the counterclockwise direction, the elevating member 9 moves in the Y2-direction, and the elevating member 9' moves in the Y1-direction. Consequently, the moving pins 13a and 13b ascend along the slopes of the crank grooves 9b and 9c, and the moving pins 13a' and 13b' on the side of the side plate 3a' ascend along the slopes of the crank grooves 9b' and 9c', so that the clamp chassis 3 is moved up in the Z1-direction.

That is, the top plate 2 and the clamp chassis 3 are moved up and down in the Z-axis direction by the first connecting member 5 and the second connecting member 6, respectively.

Figure 2A:
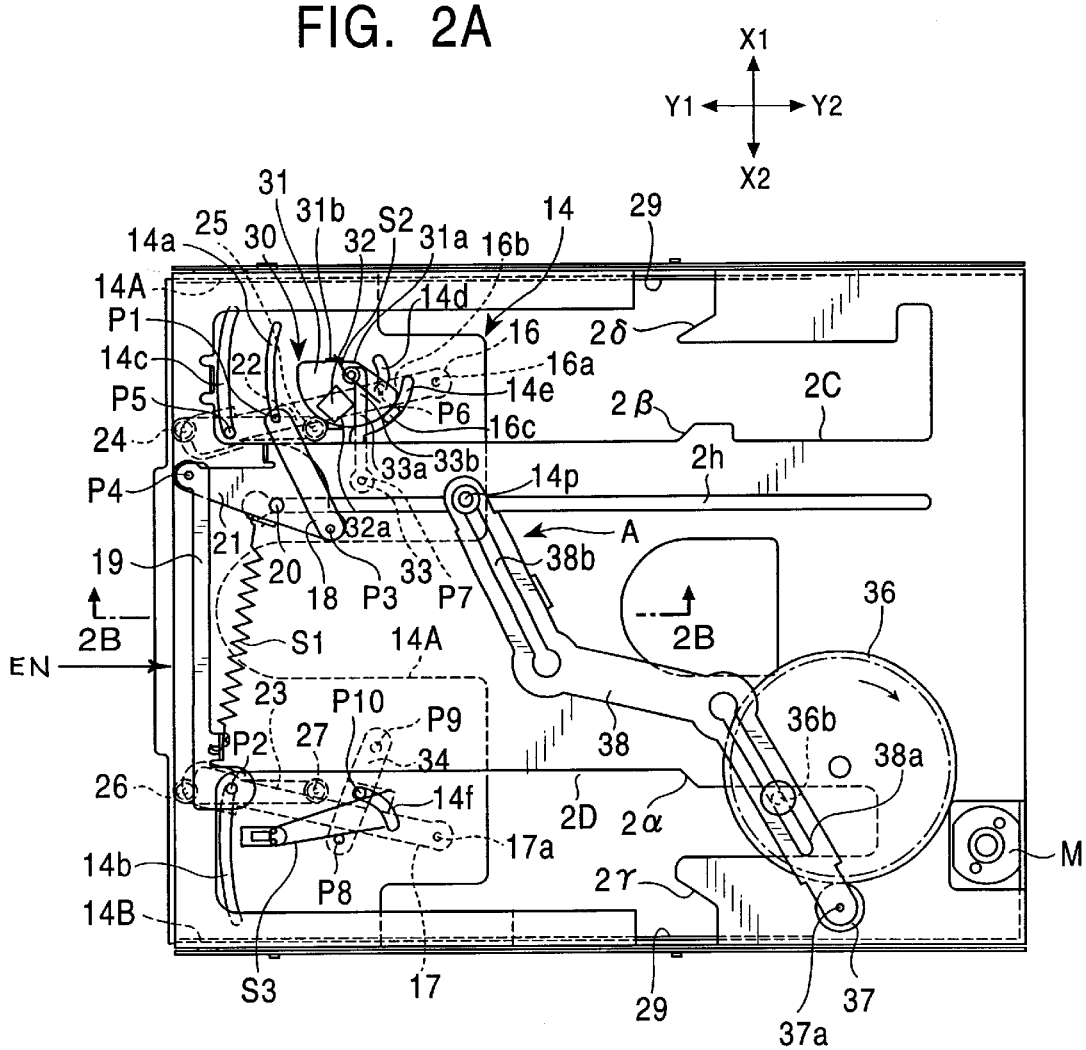
FIG. 2A is a plan view of a top plate.
Figure 2B:
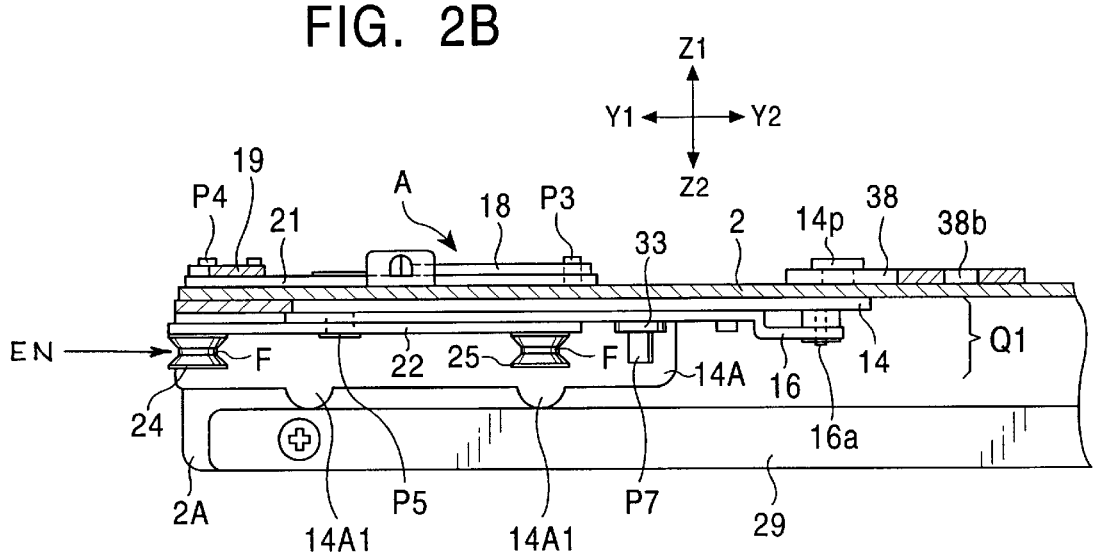
FIG. 2B is an enlarged sectional view taken along line 2B—2B of FIG. 2A.

FIG. 2A is a plan view showing the details of the top plate 2, and FIG. 2B is an enlarged sectional view taken along line 2B—2B of FIG. 2A.

As shown in FIGS. 2A and 2B, the top plate 2 is provided with a conveyor means A for introducing a disc to the inner part of the disc device. The conveyor means A is mainly provided in a slide member 14 disposed inside the top plate 2, and is movable in the Y-axis direction within a loading region Q1 on the side of the top plate 2. In FIGS. 2A and 2B, the segment indicated by the reference symbol EN denotes a loading inlet of the loading region Q1.

On the lower side of the slide member 14, pivotal arms 16 and 17 are disposed to pivot on support shafts 16a and 17a. The pivotal arm 16 is connected via a connecting pin P1 to one end of a link member 18 that is disposed on the upper surface of the top plate 2. On the other hand, the leading end of the pivotal arm 17 is connected via a connecting pin P2 to one end of a link arm 19 that is disposed on the upper side of the top plate 2. The connecting pins P1 and P2 are slidably passed through arc grooves 14a and 14b formed in the slide member 14, respectively. The link member 18 and the link arm 19 are connected via connecting pins P3 and P4 to both ends of a rotary link member 21 which turns on a turning shaft 20 that is embedded in the slide member 14 and passed through a guide groove 2h formed through the top plate 2. The link arm 19 and the rotary link member 21 are also connected by an urging member S1 such as a coil spring. Accordingly, since the rotary link member 21 is turned clockwise, as shown in FIG. 2, the link member 18 and the link arm 19 are urged in the X2-direction and in the X1-direction, respectively. That is, the pivotal arm 16 and the pivotal arm 17 are pivoted in a direction such that they come close to each other.

As shown in FIG. 2B, support portions 14A1 and 14A1 projecting from a side plate 14A of the slide member 14 are supported by a rail member 29 attached to a side plate 2A of the top plate 2, and are movable in the Y-direction along the rail member 29. This also applies to the other side plate 14B of the slide member 14.

One of the pivotal arms 16 has a support pin P5 at the leading end thereof, which is passed through an arc groove 14c formed through the slide member 14. At the leading end of the support pin P5, that is, on the lower side of the slide member 14, a support arm 22 is pivotally supported. Similarly, at the leading end of the connecting pin P2, a support arm 23 is supported so as to pivot along the lower surface of the slide member 14. At both ends of the pair of support arms 22 and 23 (support members), support pulleys 24, 25, 26, and 27 are rotatably supported.

On the upper surface of the slide member 14 adjoining the pivotal arm 16, a disc detecting mechanism 30 is provided. The disc detecting mechanism 30 comprises a push switch 32, a detection arm 33, and the like, disposed on a rotary base 31 in approximately the shape of a fan. The rotary base 31 is supported by a rotation shaft 31a. A regulating pin P6 projects from the lower surface of the rotary base 31, and is passed through an arc groove 14d formed in the slide member 14 and a slot 16b formed in the pivotal arm 16. The detection arm 33 is formed by bending a metal plate, and is supported by the rotation shaft 31a at one end thereof. The other bent end thereof extends to the lower side of the slide member 14 through an arc groove 14e formed in the slide member 14. The other end of the detection arm 33 thus extending to the lower side has a detection pin P7 embedded therein to project toward the main housing 1 (in the Z2-direction). As described above, since the pivotal arm 16 is pivoted counterclockwise, the slot 16b presses the regulating pin P6 counterclockwise. Consequently, the rotary base 31 is turned on the rotation shaft 31a in the clockwise direction. At the position corresponding to the arc groove 14e, a regulating piece 16c is formed integrally with the side of the pivotal arm 16.

The detection arm 33 is also provided with a pressing piece 33a and a retaining piece 33b formed by bending. The pressing piece 33a opposes a switch 32a of the push switch 32 disposed on the rotary base 31. An urging member S2 formed of a wire spring or the like is retained between the retaining piece 33b and a retaining piece 31b formed on the rotary base 31 by bending. Because of the urging force of the urging member S2, the detection arm 33 receives an urging force so as to pivot on the rotation shaft 31a in the clockwise direction. Consequently, the pressing piece 33a presses the switch 32a, thereby maintaining the push switch 32 in an ON-state.

As shown in FIG. 2A, adjacent to the other pivotal arm 17 and on the lower surface of the slide member 14, a detection arm 34 is supported to pivot on a support pin P8. A detection pin P9 is disposed at the leading end of the detection arm 34, and a regulating pin P10 is interposed between the support pin P8 and the detection pin P9. The detection pin P9 is projected toward the main housing 1 (in the Z2-direction) in a manner similar to the above-described detection pin P7, and is allowed to be in contact with a disc D, as will be described later. The regulating pin P10 is inserted in an arc groove 14f formed in the slide member 14. Between the support pin P8 and the regulating pin P10, an urging member S3 is formed of a wire spring or the like. Accordingly, the urging force of the urging member S3 causes the detection arm 34 to pivot counterclockwise on the support pin 8.

Figure 7:
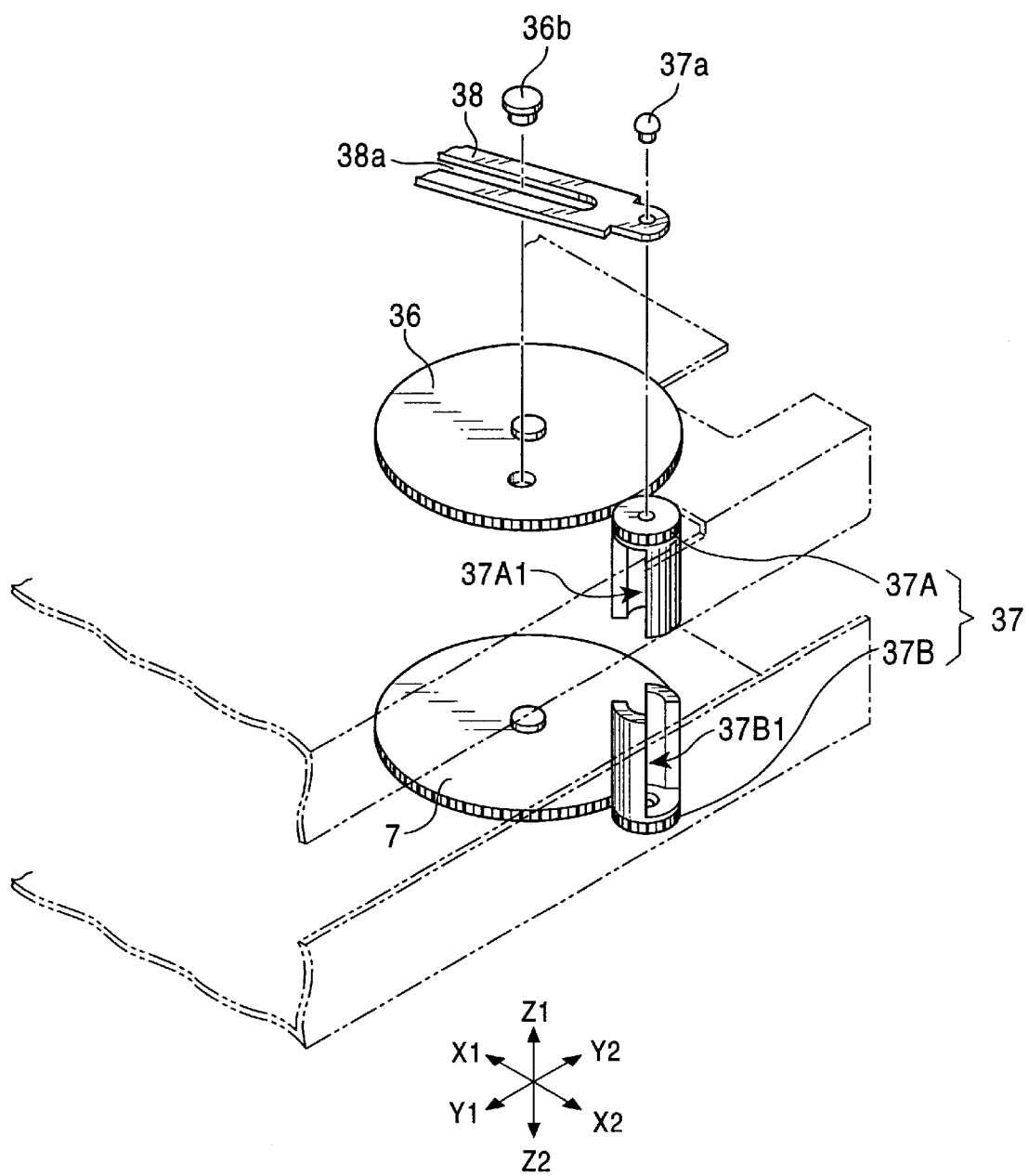
FIG. 7 is a perspective view of a transmission gear.

The rotating force of the driving motor M is transmitted to the transmission gear 37 on the side of the main housing 1 via a train of gears (not shown). FIG. 7 is a perspective view of the transmission gear 37. As shown in FIG. 7, the transmission gear 37 is composed of an upper transmission gear 37A to be meshed with a large gear 36 disposed on the upper side of the top plate 2, and a lower transmission gear 37B to be meshed with the rotating cam 7. That is, the transmission gear 37 has meshed portions 37A1 and 37B1 that are combined in a spline manner. In a state in which these meshed portions 37A1 and 37B1 are meshed with each other, the upper transmission gear 37A can move in the longitudinal direction (in the Z-direction). Therefore, even when the top plate 2 moves up and down, as described above, the driving force of the driving motor M can be transmitted from the lower transmission gear 37B to the upper transmission gear 37A, so that the large gear 36 is being constantly rotated in synchronization with the rotating cam 7.

One end of a conveyor arm 38 is pivotally supported by a rotation shaft 37a at the top of the upper transmission gear 37A. The conveyor arm 38 is formed by subjecting a thin metal plate to pressing or other methods, and is provided with two slide grooves 38a and 38b, as shown in FIG. 2A. A guide pin 36b embedded in the surface of the large gear 36 is passed through one of the slide grooves 38a. Through the other slide groove 38b, a connecting pin 14p is passed, which is embedded in the slide member 14 and projected to the upper side of the top plate 2 through the guide groove 2h. Accordingly, when the large gear 36 is rotated, the guide pin 36b moves within the slide groove 38a, and the conveyor arm 38 is pivoted on the rotation shaft 37a. Since the connecting pin 14p is thereby moved in the Y-axis direction within the guide groove 2h, the slide member 14 is allowed to reciprocate between the disc loading slot and the inner part of the device.

Figure 3A:
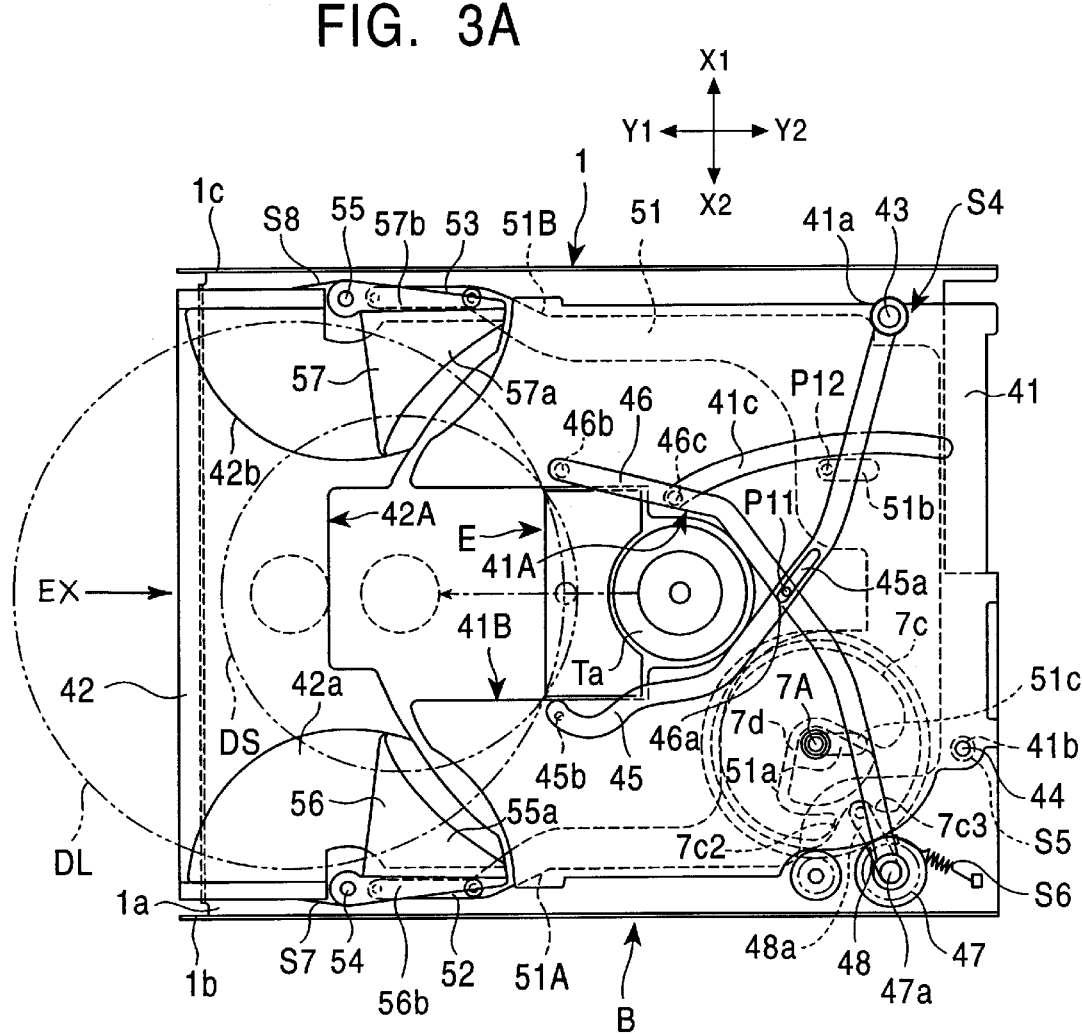
FIGS. 3A and 3B are plan and side views showing a disc ejection means in an ejection state.
Figure 3B:
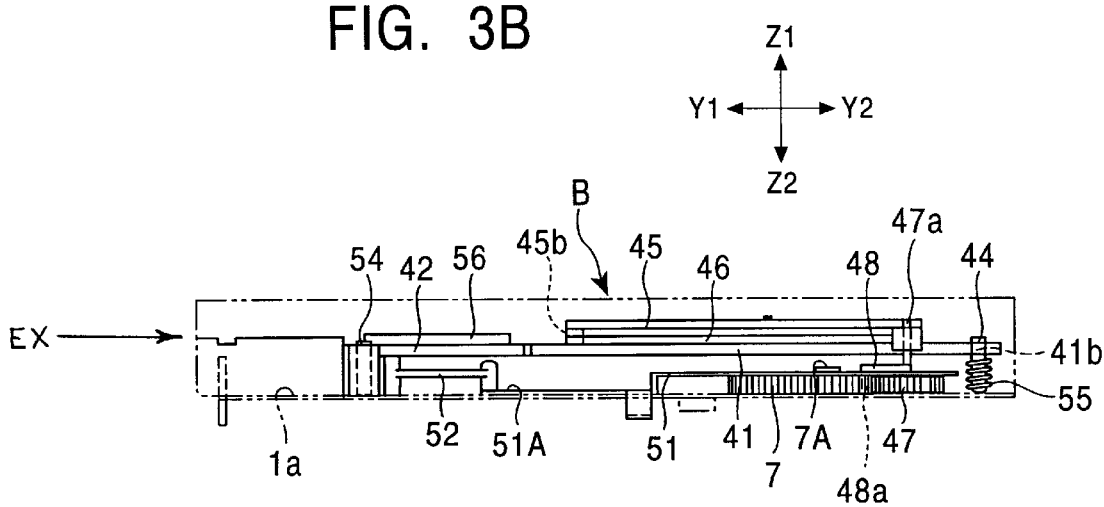
Figure 4:
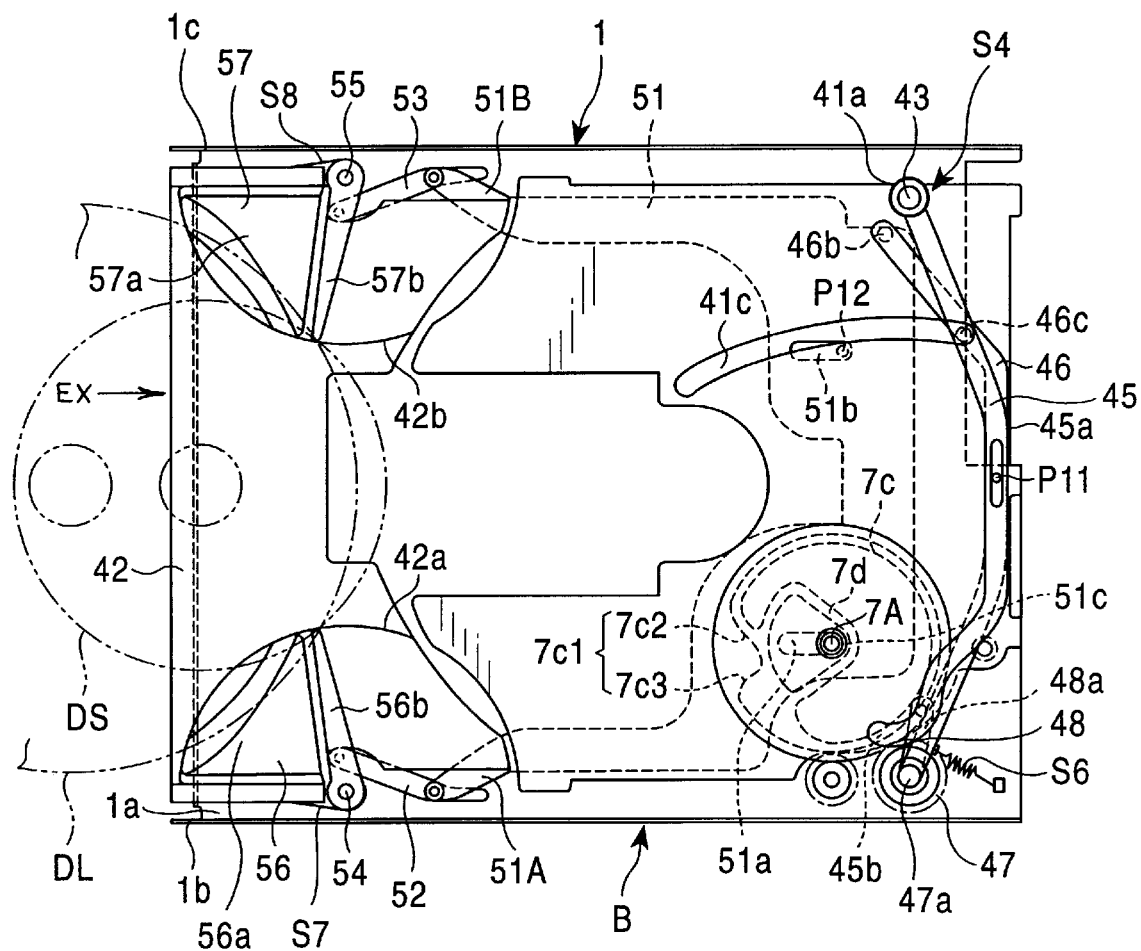
FIG. 4 is a plan view showing the disc ejection means in a retracted state.

FIG. 3A is a plan view showing illustrating an ejection state of a disc ejection means, FIG. 3B is a side view of the disc ejection means shown in FIG. 3A, and FIG. 4 is a plan view illustrating a retracted state of the disc ejection means.

A disc ejection means B shown in FIGS. 3 and 4 is interposed between the clamp chassis 3 and the main housing 1 described above, and is composed of a side of a moving table 41 and a side of a disc guide plate 42. The moving table 41 lifts and temporarily holds a disc on a turntable Ta when the disc is ejected. The moving table 41 is made so as to be movable up and down in the Z-direction by fitting through holes 41a and 41b formed through the moving table 41, respectively, on columns 43 and 44 embedded in the bottom face 1a of the main housing 1. Urging members S4 and S5, such as a coil spring, are fitted on the columns 43 and 44 between the moving table 41 and the bottom face 1a, so that the moving table 41 is urged in the Z1-direction. On the other hand, the disc guide plate 42 is horizontally fixed at a predetermined height from the bottom face 1a of the main housing 1.

On the upper surface of the moving table 41, ejection arms 45 and 46 having the shape shown in FIG. 3A are disposed to constitute a first ejection member. The ejection arm 45 is disposed at the leading end of the column 43 to pivot and move up and down. One end of the ejection arm 46 is disposed at a center shaft 47a, which adjoins the rotating cam 7, together with a small gear 47 and a driven arm 48. The ejection arm 46 is located on the upper side (Z1) of the moving table 41 so as to pivot on the center shaft 47a and move up and down. In contrast, the small gear 47 and the driven arm 48 are located on the lower side (Z2) of the moving table 41, and the small gear 47 is meshed with the gear grooves of the rotating cam 7. The driven arm 48 has at its leading end a projection 48a, which is inserted in a cam groove 7c formed on the upper surface of the rotating cam 7. The ejection arm 46 and the driven arm 48 share the same axis (the center shaft 47a), are retained by each other, and are thereby pivoted in combination. The driven arm 48 is provided with an urging member S6, which always urges the driven arm 48 clockwise. Accordingly, the ejection arm 46 is also always urged clockwise.

The ejection arm 45 and the ejection arm 46 intersect in three dimensions, and are connected at the intersecting portion. That is, both are connected by loosely fitting a connecting pin P11 between a slot 45a formed in the center of the ejection arm 45 and a through hole 46a formed through the ejection arm 46. A projection 46c projects in the Z2-direction between a pressing portion 46b at the leading end of the ejection arm 46 and the through hole 46a, and is passed through an arc-shaped guide groove 41c formed in the moving table 41.

The upper surface of the rotating cam 7 has the cam groove 7c on the outer peripheral side, and a cam groove 7d on the inner peripheral side. The projection 48a of the driven arm 48 is inserted in the cam groove 7c, as described above, and a projection 51c of an ejection slider 51, which will be described later, is inserted in the cam groove 7d. The cam groove 7c includes a conical groove 7c projecting toward the rotation shaft 7A (see FIG. 4). When the rotating cam 7 is turned clockwise, the projection 48a moves to the top along an uphill slope 7c2 of the conical groove 7c1, whereby the driven arm 48 is pivoted counterclockwise. Since the driven arm 48 and the ejection arm 46 are combined, as described above, the ejection arm 46 is also pivoted counterclockwise. As a result, the leading end of the ejection arm 46 is moved and expanded in the Y1-direction. At this time, since the ejection arm 45 connected to the ejection arm 46 by the connecting pin P11 is also expanded in the Y1-direction, an ejection state shown in FIG. 3A is brought about.

When the rotating cam 7 is turned further clockwise, the projection 48a passes the top of the conical groove 7c1, and moves along a downhill slope 7c3. Since the driven arm 48 is thereby pivoted clockwise, the ejection arms 45 and 46 are moved and retracted in the Y2-direction, in contrast to the above, and placed into a retracted state shown in FIG. 4.

Expansion and retraction of the first ejection member (the ejection arms 45 and 46) are performed once per turn of the rotating cam 7. Retraction of the first ejection member is performed in a shorter time than expansion because the downhill slope 7c3 is steeper than the uphill slope 7c2 and the driven arm 48 receive surging force from the urging member S6.

The ejection arms 45 and 46 have pressing portions 45b and 46b at the other ends thereof, respectively. These pressing portions 45b and 46b are located to face the rim of a disc to be stored on the moving table 41. Accordingly, when the ejection arms 45 and 46 shift from the retracted state to the ejection state, the pressing portions 45b and 46b act to press out the rim of the disc toward the ejection slot EX, and therefore, the disc can be moved in the Y1-direction.

As shown in FIGS. 3 and 4, the ejection slider 51 is interposed between the moving table 41 and the rotating cam 7. The ejection slider 51 has a pair of slots 51a and 51b. The rotation shaft 7A of the rotating cam 7 is passed through one of the slots 51a. The leading end of a support pin P12 embedded in the bottom face 1a is passed through the other slot 51b. That is, the ejection slider 51 is able to slide in the Y-axis direction along the slots 51a and 51b. The ejection slider 51 also has a projection 51c projecting in the Z2-direction, which is inserted in the cam groove 7d formed on the surface of the rotating cam 7. Accordingly, the ejection slider 51 reciprocates in the Y-axis direction in accordance with the rotation of the rotating cam 7.

Link levers 52 and 53 are pivotally disposed at left and right leading end portions 51A and 51B of the ejection slider 51. The ejection slider 51 is connected to ejection levers 56 and 57 constituting a second ejection member, which will be described later, via these link levers 52 and 53, and the link levers 52 and 53 are pivotally supported on the lower side of the ejection levers 56 and 57.

Nearly semicircular stepped recesses 42a and 42b are formed at the X1-side and X2-side ends of the disc guide plate 42. In the bottom face 1a of the main housing 1, rotation shafts 54 and 55 are embedded at the positions corresponding to the centers of the stepped recesses 42a and 42b. The rotation shafts 54 and 55 pivotally support the ejection levers 56 and 57, and approximately triangular receiving portions 56a and 57a are turnable within the stepped recesses 42a and 42b.

The ejection levers 56 and 57 have, on one side, pressing pieces 56b and 57b that extend from the rotation shafts 54 and 55 in the Y2-direction. The ejection levers 56 and 57 are also provided with urging members S7 and S8 formed by a wire spring or the like that are disposed coaxially with the rotation shafts 54 and 55. That is, the ejection lever 56 and the ejection lever 57 receive a clockwise urging force and a counterclockwise urging force, respectively.

When the ejection slider 51 is moved in the Y1-direction, the link levers 52 and 53 also move in the Y1-direction. Thereby, the ejection lever 56 is pivoted counterclockwise and the ejection lever 57 is pivoted clockwise, whereby a closed state shown in FIG. 4 is brought about. Conversely, when the ejection slider 51 is moved in the Y2-direction, since the link levers 52 and 53 are also moved in the Y2-direction, the ejection lever 56 is pivoted clockwise, and the ejection lever 57 is pivoted counterclockwise. That is, the ejection levers 56 and 57 are brought into an open state in which they are pushed open toward the inner part of the device (in the Y2-direction).

The first ejection member and the second ejection member eject the disc D under the above-described loading region Q1, i.e., in an ejection region corresponding to the ejection slot EX.

As shown in FIG. 3, a disc driving section E is provided in a recessed portion 41A of the moving table 41 that is cut out into a semicircle. That is, the turntable Ta is placed to face the clamper 4 shown in FIG. 1 (see FIG. 1B), and a pickup, in which an optical head, a magnetic head, or the like is mounted, is placed in a space formed by a recessed portion 41B of the moving table 41 and a recessed portion 42A of the disc guide plate 42, which are cut out into an angular-U shape. The pickup is slidably supported by, for example, a guide shaft disposed parallel to the Y-axis direction, to move toward the center of the turntable Ta, and is able to perform playback or recording of a disc clamped between the turntable Ta and the clamper 4.

A description will be given of the operation of the disc device having the above construction.

(Initial State Before Inserting Disc)

In an initial state before a disc is inserted into the disc device, the first ejection member (the ejection arms 45 and 46) is in a retracted state, and the second ejection member (the ejection levers 56 and 57) is in an open state. The top plate 2, the clamp chassis 3, and the moving table 41 are all in the down position (in a clamped state) on the Z2-side, and the slide member 14 is positioned on the side of the loading (Y1-side).

(Disc Inserting Operation)

(i) In the case of a small-diameter disc

Figure 5:
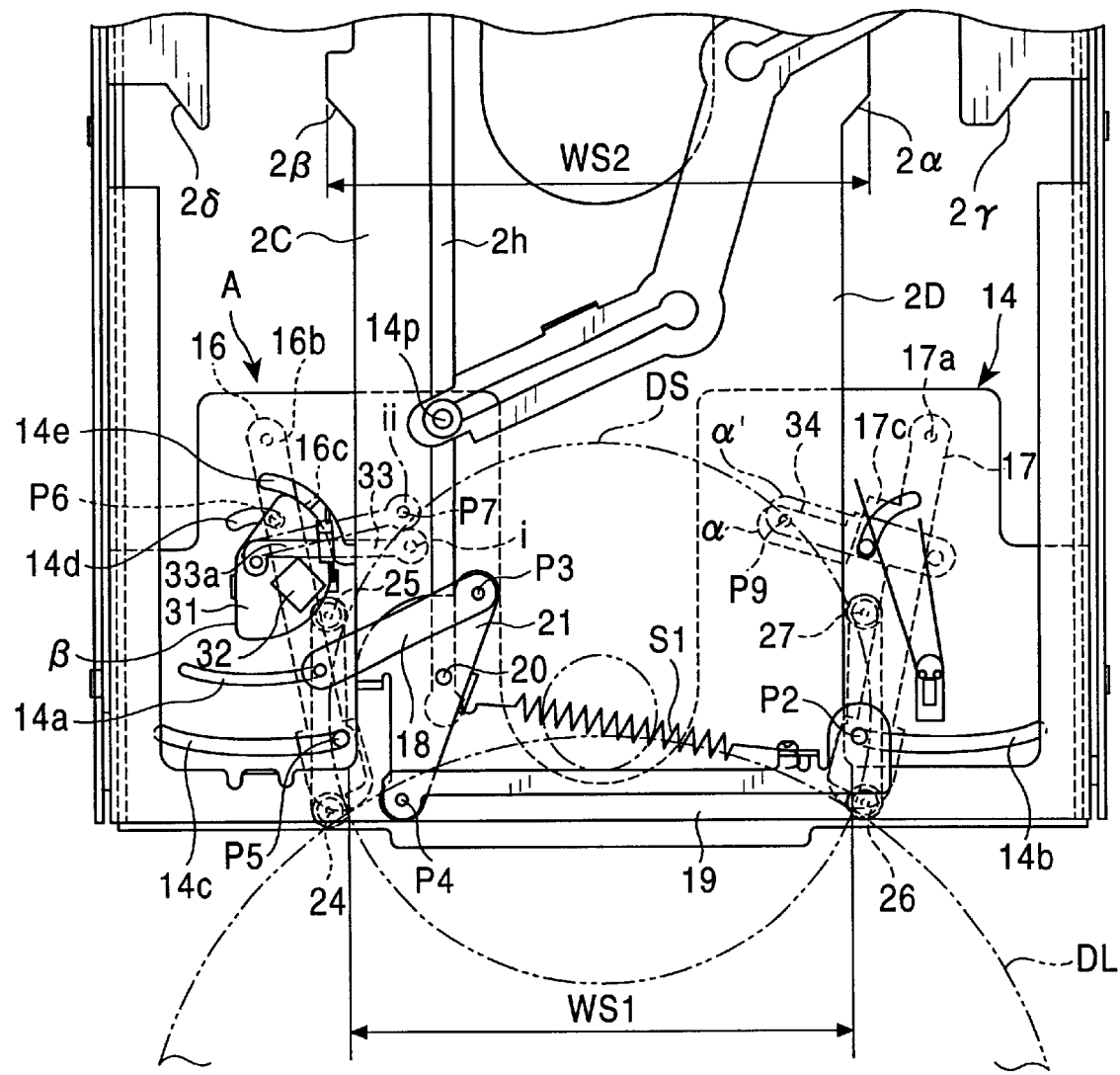
FIG. 5 is an enlarged plan view showing a state in which a small-diameter disc is clamped.

FIG. 5 is an enlarged plan view showing a state in which a small-diameter disc is clamped by the conveyor means A.

When a small-diameter disc (8 cm) DS is inserted from the loading slot EN on the slot EN, as shown in FIG. 5, the rim of the small-diameter disc DS is clamped in flanges F (see FIG. 2B) of the support pulleys 24 and 26 on the leading side of the loading slot EN. The support arms 22 and 23 are thereby appropriately pivoted along the rim of the small-diameter disc DS. When the small-diameter disc DS is inserted further in the Y2-direction, since the leading-side rim thereof is clamped by the support pulleys 25 and 27 in the inner part of the device, the entire small-diameter disc DS is supported by the four support pulleys 24, 25, 26, and 27, as shown in FIG. 5.

Since the detection pins P7 and P9 described above are placed within a region of the small-diameter disc DS supported as shown in FIG. 5, the rim of the small-diameter disc DS is brought into contact with the detection pins P7 and P9. The detection arm 33 having the detection pin P7 is thereby pivoted counterclockwise, and simultaneously, the detection arm 34 having the detection pin P9 is pivoted clockwise. Since the regulating piece 16c of the pivotal arm 16 is positioned within the pivot range of the detection arm 33, the detection arm 33 pivots from the position indicated by the number i to the position indicated by the number ii in which the detection arm 33 butts against the regulating piece 16c. Similarly, the detection arm 34 having the detection pin P9 pivots from the position indicated by the letter α to the position indicated by the letter α' in which it butts against a regulating piece 17c. That is, the insertion of the small-diameter disc DS is completed when the rim of the disc DS has pressed the detection pins P7 and P9 and the detection arms 33 and 34 have reached the positions indicated by the number ii and the letter α', respectively.

When the detection arm 33 is pivoted, since the switch 32a is released from pressing by the pressing piece 33a, an OFF signal is output from the push switch 32. Accordingly, it is possible in the disc device to detect the new small-diameter disc DS being clamped by the support pulleys 24, 25, 26, and 27.

When the clamped small-diameter disc DS is detached from the support pulleys 24, 25, 26, and 27 manually or due to a problem, an ON signal is output again from the push switch 32. Therefore, it is possible to detect the disc separated from the support pulleys, and to detect problems during transportation and the like.

(ii) In the case of a large-diameter disc

Figure 6:
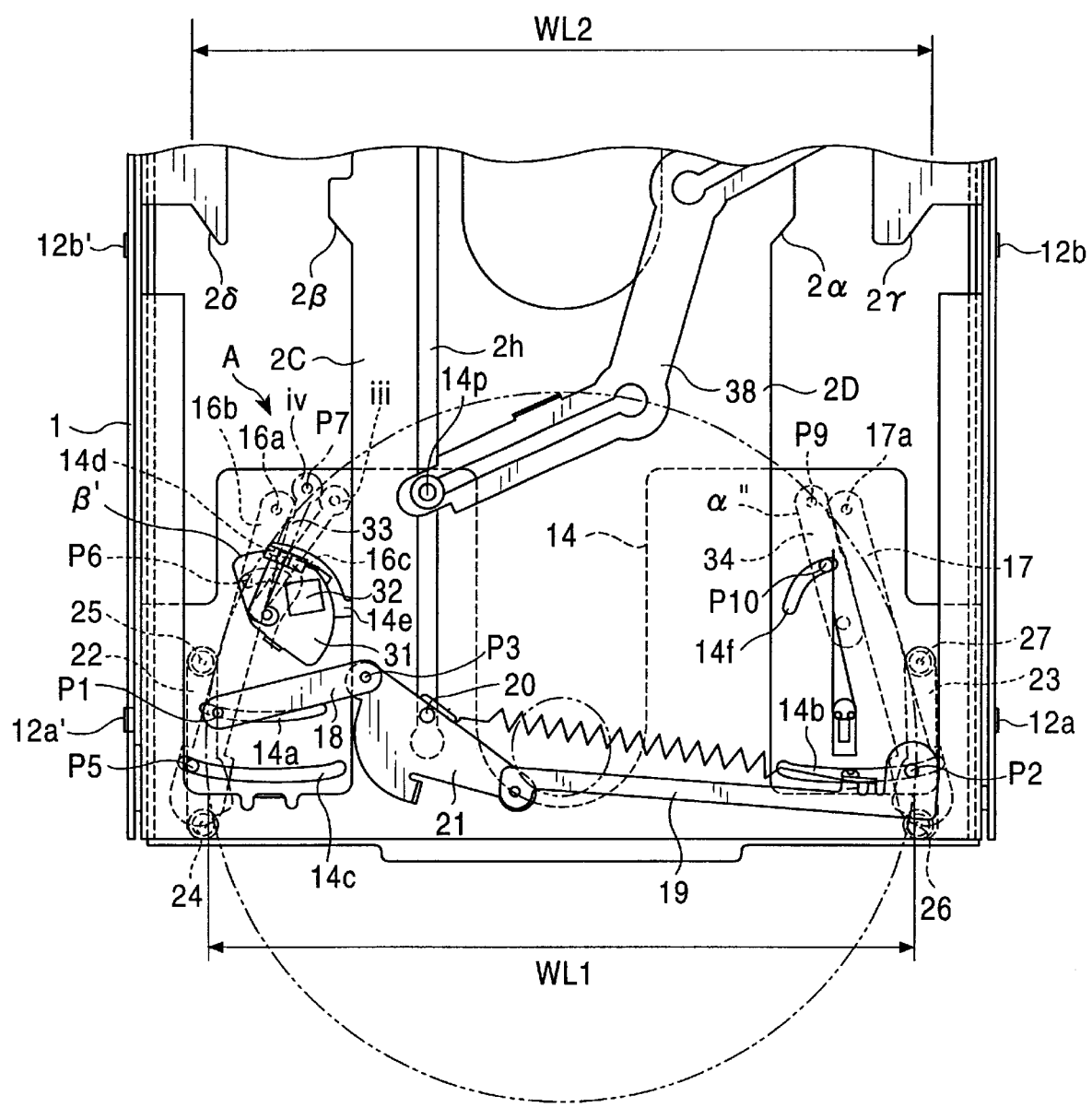
FIG. 6 is an enlarged plan view showing a state in which a large-diameter disc is clamped.

FIG. 6 is an enlarged plan view showing a state in which a large-diameter disc is clamped by the conveyor means A.

As shown in FIG. 6, when a large-diameter disc (12 cm) DL is inserted in the loading slot EN, the leading rim thereof is brought into contact with the flange portions of the support pulleys 24 and 26. The support arm 22 is pivoted clockwise, and the support arm 23 is pivoted counterclockwise, thereby slightly increasing the distance between the support pulley 24 and the support pulley 26. When the large-diameter disc DL is inserted further, the support pulleys 24 and 26 turn along the rim of the large-diameter disc DL, and the pivotal arms 16 and 17 are pushed open in the X1-direction and X2-direction. In this case, the pivoting is performed centered on the rotary link member 21 via the link member 18 and the link arm 19, as described above, and the pivotal arms 16 and 17 are equally pushed open. Accordingly, the large-diameter disc DL can be inserted in a straight manner toward the inner part of the device (Y2-side).

At this time, the support arms 22 and 23 are appropriately pivoted on the support pin P5 and the connecting pin P2, and the pivotal arms 16 and 17 are also pivoted, whereby the large-diameter disc DL is held at its rim by the four support pulleys 24, 25, 26, and 27.

When the pivotal arm 16 is pivoted, the slot 16b of the pivotal arm 16 presses the regulating pin P6 in the X1-direction, and therefore, the rotary base 31 is turned on the rotation shaft 31a in the counterclockwise direction. Simultaneously, the regulating piece 16c is displaced from the position opposing the arc groove 14e. Since the detection arm 33 is out of contact with the regulating piece 16c, the rotary base 31 is allowed to turn counterclockwise. That is, the rotary base 31 is turned from the position indicated by the letter β shown in FIG. 5 to the position indicated by the letter β' shown in FIG. 6. Although the detection arm 33 is shifted from the position of the number i shown in FIG. 5 to the position indicated by the number iii shown in FIG. 6 because of the counterclockwise turn of the rotary base 31, since the detection pin P7 is simultaneously pressed by the rim of the large-diameter disc DL, the detection arm 33 is finally pivoted to the position indicated by the number iv in which it is regulated by the end of the arc groove 14e. Similarly, the detection pin P9 of the other detection arm 34 is pressed by the rim of the large-diameter disc DL, and the detection arm 34 is pivoted from the position of the letter a shown in FIG. 5 to the position of the letter α" shown in FIG. 6. When the detection arm 33 is pivoted from the position iii to the position iv, only the detection arm 33 is pivoted, while the rotary base 31 is not turned, but remains in the position indicated by the letter β'. Since the switch 32a is thereby released from pressing by the pressing piece 33a, and an OFF signal is output from the push switch 32, it is possible in the disc device to detect the new large-diameter disc DL being clamped by the support pulleys 24, 25, 26, and 27.

The insertion of the large-diameter disc DL is completed when the detection pins P7 and P9 reach the positions indicated by iv and α", respectively.

(Disc Loading Operation 1)

In the following description, both the new small-diameter disc DS and large-diameter disc DL, which are clamped by the support pulleys 24, 25, 26, and 27, will be referred to as "second discs D2", unless otherwise specified.

When an OFF signal from the push switch 32 is detected in the disc inserting operation, as described above, a spindle motor (not shown) in the disc driving section E is stopped to terminate the playback or recording operation for the existing disc (hereinafter referred to as the "first disc D1") that has been performed so far. Subsequently, the rotating cam 7 starts to turn in response to the rotation of the driving motor M, and the clamp chassis 3 is lifted in the inner part of the disc device, thereby releasing the first disc from the clamped state. That is, as described above, the second connecting member 6 is pivoted counterclockwise, the elevating member 9 is moved in the Y2-direction, and the elevating member 9' is moved in the Y1-direction. The moving pins 13a and 13b thereby ascend along the slopes of the crank grooves 9b and 9c, and the moving pins 13a' and 13b' on the side of the side plate 3a' ascend along the slopes of the crank grooves 9b' and 9c', so that the clamp chassis 3 is moved up in the Z1-direction to bring about an unclamped state. In connection with the upward movement of the clamp chassis 3, the moving table 41 receives urging force from the urging members S4 and S5 and moves upward in the Z1-direction, and the first ejection member is also moved up.

The second disc D2 (the small-diameter disc DS or the large-diameter disc DL) held by the support pulleys 24, 25, 26, and 27 is conveyed to the inner part of the disc device by the movement of the slide member 14 in the Y2-direction, as described above.

As shown in FIG. 2, the rotating force of the driving motor M is transmitted to the transmission gear 37 via the train of gears, thereby rotating the large gear 36 in the clockwise direction. At this time, the guide pin 36b moves within the slide groove 38a, thereby pivoting the conveyor arm 38 clockwise. Furthermore, since the connecting pin 14p is moved in the guide groove 2h in the Y2-axis direction, the slide member 14 connected to the connecting pin 14p is moved toward the inner part of the device. That is, the slide member 14 moves to the inner part of the device while keeping the disc D2 held by the support pulleys 24, 25, 25, and 27.

As shown in FIGS. 2, 5, and 6, the top plate 2 has large openings 2C and 2D extending in the Y-direction. Near the centers of the openings 2C and 2D, tapered portions 2α, 2β, 2γ, and 2δ are formed.

When the second disc D2 is a small-diameter disc DS, the connecting pin P2 opposes the tapered portion 2α, and the support pin P5 opposes the tapered portion 2β. Assuming that the width between the connecting pin P2 and the support pin P5 in the conveyor means A holding the small-diameter disc DS is designated WS1 and that the width between the tapered portion 2α and the tapered portion 2β is designated WS2, there is a relationship in which WS1<WS2. Accordingly, when the slide member 14 moves toward the inner part of the device (in the Y2-direction) while the small-diameter disc DS is being held in the conveyor means A, the connecting pin P2 and the support pin P5 abut against the tapered portion 2α and the tapered portion 2β, whereby the loading operation of the slide member 14 is temporarily stopped.

In contrast, when the second disc D2 is a large-diameter disc DL, the connecting pin P2 opposes the tapered portion 2γ, and the support pin P5 opposes the tapered portion 2δ. Assuming that the width between the connecting pin P2 and the support pin P5 in the conveyor means A holding the large-diameter disc DL is designated WL1 and that the width between the tapered portion 2γ and the tapered portion 2δ is designated WL2, there is a relationship in which WL1<WL2.

When the slide member 14 is moved toward the inner part of the device (in the Y2-direction) while the large-diameter disc DL is being held in the conveyor means A, the connecting pin P2 and the support pin P5 abut against the tapered portions 2γ and 2δ. In a manner similar to the small-diameter disc DS, the loading operation of the slide member 14 is temporarily stopped when the connecting pin P2 and the support pin P5 abut against the tapered portions 2γ and 2δ.

In both the cases of the small-diameter disc DS and the large-diameter disc DL, the loaded second disc D2 (the small-diameter disc DS or the large-diameter disc DL) is positioned between the clamper 4 and the turntable Ta. When the slide member 14 is temporarily stopped, a support projection (hub) of the turn table Ta is positioned nearly directly below a center hole of the second disc D2, and the clamper 4 is positioned nearly directly above the center hole.

(Disc Ejecting Operation)

While the disc loading operation is being performed in the loading region Q1 in the upper part of the disc device, a disc ejecting operation is simultaneously performed in the lower part.

The existing first disc D1, which has undergone playback or recording thus far, is laid on the moving table 41 lifted in connection with the upward movement of the clamp chassis 3. When the rotating cam 7 is turned, the ejection arms 45 and 46 held in the retracted state, as described above, are expanded in the Y1-direction. The pressing portions 45b and 46b at the leading ends of the ejection arms 45 and 46 thereby push the first disc D1 on the moving table 41 toward the ejection slot EX (in the Y1-direction) and move the first disc D1 to the operation areas of the ejection levers 56 and 57, which will next be described. Immediately after the ejection arms 45 and 46 are shifted from the retracted state to the expanded state, as described above, they are returned to the retracted state (see FIG. 4).

When the rotating cam 7 is turned further, the ejection levers 56 and 57 in the open state are pivoted into a closed state. That is, as described above, the ejection slider 51 is moved in the Y1-direction via the projection 51c that is inserted in the cam groove 7d of the rotating cam 7. Since the link levers 52 and 53 are thereby moved in the Y1-direction, the ejection levers 56 and 57 are put into the closed state. At this time, since the rim of the first disc D1 on the side of the inner part of the device is pushed out in the Y1-direction by the pressing pieces 56b and 57b of the ejection levers 56 and 57, the first disc D1 is ejected to the outside of the disc device from the ejection slot EX. That is, the ejection levers 56 and 57 serve to further lead the first disc D1, which has been pushed out of the turntable Ta by the ejection arms 45 and 46, to the ejection slot EX.

If the first disc D1 ejected from the ejection slot EX is pushed in the Y2-direction, since the rotating cam 7 is turned in a reverse direction, the ejection levers 56 and 57 in the closed state are not pushed open. Consequently, it is possible to prevent the ejected disc from being inserted again into the disc device.

(Disc Loading Operation 2)

As described above, when the new second disc D2 is inserted from the loading slot EN, the first disc D1, which has undergone playback or recording in the disc device, is ejected from the ejection slot EX. Therefore, the first disc D1 is not on the turntable Ta, whereas the new second disc D2 introduced by the conveyor means A is held between the clamper 4 and the turntable Ta.

When the rotating cam 7 is turned further in this state, the top plate 2 and the clamp chassis 3 are moved down in the Z2-direction, and an operation of clamping the second disc D2 is performed.

That is, as described above, the first connecting member 5 is pivoted counterclockwise in connection with the rotating cam 7, and the elevating member 8 and the elevating member 8' are thereby relatively moved. The moving pins 12a and 12b on the side of the side plate 1b descend along the slopes of the crank grooves 8b and 8c, and the moving pins 12a' and 12b' on the side of the side plate 1c descend along the slopes of the crank grooves 8b' and 8c', whereby the top plate 2 is moved down. Similarly, the elevating member 9 and the elevating member 9' are relatively moved by pivoting the second connecting member 6 clockwise, the moving pins 13a and 13b on the side of the side plate 3a descend along the slopes of the crank grooves 9b and 9b, and the moving pins 13a' and 13b' on the side plate 3a' descend along the slopes of the crank grooves 9b' and 9c', whereby the clamp chassis 3 is moved down. By this downward movement of the clamp chassis 3, the center hole of the second disc D2 is fitted on the support projection (hub) of the turntable Ta, and is clamped by the clamper 4 and the turntable Ta. The moving table 41 and the first ejection member are also moved down in the Z2-direction with the downward movement of the clamp chassis 3.

This clamping operation is performed in a state in which the second disc D2 is being held by the support pulleys 24, 25, 26, and 27. Since the second disc D2 is held at the rim by the support pulleys 24, 25, 26, and 27 and is pressed only at the center hole toward the turntable Ta by the clamper 4, it is clamped with its center portion slightly curved in a downwardly (Z2-direction) convex manner.

When the clamping operation for the second disc D2 is completed, the inward movement of the slider 14 is restarted. That is, the slider member 14 is led toward the further inner part of the device from the above state in which the disc loading operation is temporarily stopped.

When the second disc D2 is a small-diameter disc DS, the connecting pin P2 is pushed open in the X2-direction by the tapered portion 2α, and simultaneously, the support pin P5 is pushed open in the X1-direction by the tapered portion 2β. Since the width WS1 between the connecting pin P2 and the support pin P5 is increased to be equal to the width WS2 between the tapered portion 2α and the tapered portion 2β, the distances between the support pulleys 24 and 25, and the support pulleys 26 and 27 is also increased. Since the small-diameter disc DS is thereby released from the support pulleys 24, 25, 26, and 27, it is clamped on the turntable Ta in a horizontal position.

In contrast, when the second disc D2 is a large-diameter disc DL, the connecting pin P2 is pushed open in the X2-direction by the tapered portion 2γ and the support pin P5 is pushed open in the X1-direction by the tapered portion 2δ. Therefore, the width WL1 between the connecting pin P2 and the support pin P5 is increased to be equal to the width WL2 between the tapered portion 2γ and the tapered portion 2δ. Since the large-diameter disc DL is thereby released from the support pulleys 24, 25, 26, and 27 in a manner similar to the small-diameter disc DS, it assumes a horizontal position on the turntable Ta.

(During Playback or Recording Operation)

As described above, when the new second disc D2 is clamped on the turntable Ta, the spindle motor in the disc driving section E starts to rotate, thereby rotating the second disc D2. Then, the pickup is moved in the radial direction of the second disc D2 to perform playback or recording for the second disc D2.

On the other hand, the first disc D1, which has been ejected to the ejection slot EX, is allowed to be manually removed. A sensor (e.g., an optical sensor) is disposed near the ejection slot EX to detect the presence or absence of the disc. If the first disc D1 is left at the ejection slot, the slider member 14, which has been moved to the inner part of the device, remains in that state, and disc playback or recording is performed.

When the sensor detects that the first disc D1 has been removed from the ejection slot EX, the rotating cam 7 is further turned. This turn moves the slider member 14 toward the loading slot EN (in the Y1-direction), and moves the ejection slider 51 in the Y2-direction to shift the ejection levers 56 and 57 serving as the second ejection member into an open state, whereby the initial state is brought about again. That is, a standby state is set in which insertion of a new disc is awaited.

According to the present invention that has been described in detail above, it is possible to shorten the time necessary for disc change.

Furthermore, since the existing disc and a new disc can be switched inside the disc device, it is possible to eliminate the necessity for troublesome disc exchange outside the disc device.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A disc device comprising:

a conveying mechanism to transfer a disc inserted from a loading slot to a disc driving section; and an ejection mechanism to eject the disc from said disc driving section to an ejection slot separately formed from said loading slot, said ejection mechanism and said conveying mechanism being different mechanisms, wherein said ejection mechanism includes a first ejection member to move the disc by a first predetermined distance from above the disc driving section in an ejecting direction toward the ejection slot and a second ejection member to push out the disc moved by the first predetermined distance toward said ejection slot continuous with the ejecting direction of said first election member;

said first ejection member includes a pair of ejection arms, one end of each of the ejection arms is rotatable supported at said disc driving section while being spaced apart by a second predetermined distance, intersected and pivotally supported at a central location, said pair of ejection arms are extendable and retractable in said ejecting direction, said pair of ejection arms perform a pushing-out operation in which the pair of ejection arms are extended from a retracted state in cooperation with a disc conveying motion of said conveying mechanism and push the disc with each of the other ends of said pair of ejection arms toward said ejection slot, and the pair of ejection arms retract after the pushing-out operation;

said second ejection member includes a pair of opposing ejection levers spaced apart by a third predetermined distance from said first ejection member toward a disc ejecting direction, each of said ejection levers is rotatably supported in different directions from said disc driving section toward said ejection slot for the disc and are openable and closable, said pair of ejection levers are operated such that when the ejection levers are in an opened state and after the disc is pushed out only by a fourth predetermined distance in an ejecting direction by said first ejection member, said ejection levers are turned to move from the opened state to a closed state, said disc is pushed out toward said ejection slot and after the disc is pushed out, the ejection levers are moved to the opened state.

2. A disc device according to claim 1, wherein said ejection mechanism is arranged at a vertically movable moving table such that the disc mounted on a turntable acts as said disc driving section synchronous with a conveying action of the disc of said conveying mechanism.

3. A disc device according to claim 1, further comprising a rotary cam to drive said first ejection mechanism and said second ejection mechanism.

4. A disc device according to claim 3, said rotary cam comprising a disc having a first cam groove to cause said pair of ejection arms to be extendable and retractable and a second cam groove to cause said pair of ejection levers to be transferred to one of the opened and closed states.

5. A disc device according to claim 3, further comprising:
a pair of link levers rotatably connected to each of said pair of ejection levers at one end;
an ejection slider connected with each of the other ends of the link levers and sliding in said ejecting direction, said ejecting slider driven by said common rotary cam to one of open and close said pair of ejection levers.

6. A disc device according to claim 1, said conveying mechanism comprising a sliding member having a plurality of supporting pulleys to hold a disc, to hold the disc inserted through said loading slot with said plurality of supporting pulleys and to feed the disc into said disc driving section.

7. A disc unit according to claim 6, said sliding member comprising:
a pair of rotary arms spaced apart by a fifth predetermined distance and rotatably supported around one end of each of the rotary arms;
supporting arms, each supporting arm pivotally supported at the other end of one of said both rotary arms and rotatably supporting one of said supporting pulleys;
a link mechanism to connect said both rotary arms and turning said both rotary arms in cooperative approaching direction and repelling direction to each other; and
a biasing member to bias said link mechanism and cause said both rotary arms to be turned in a direction approaching each other.

* * * * *

UNITED STATES PATENT AND TRADEMARK OFFICE
CERTIFICATE OF CORRECTION

PATENT NO. : 6,256,280 B1
DATED : July 3, 2001
INVENTOR(S) : Toshihiro Sakurai et al.

It is certified that error appears in the above-identified patent and that said Letters Patent is hereby corrected as shown below:

<u>Title page,</u>
U.S. PATENT DOCUMENTS,
Delete "Costman" and substitute -- Costemore d'Arc -- in its place.

ABSTRACT,
delete "disk" and substitute -- disc -- in its place.

<u>Claim 1,</u>
Line 18, delete "rotatable" and substitute -- rotatably -- in its place.

Signed and Sealed this

Nineteenth Day of March, 2002

Attest:

JAMES E. ROGAN
*Attesting Officer*  *Director of the United States Patent and Trademark Office*